Figure 1:
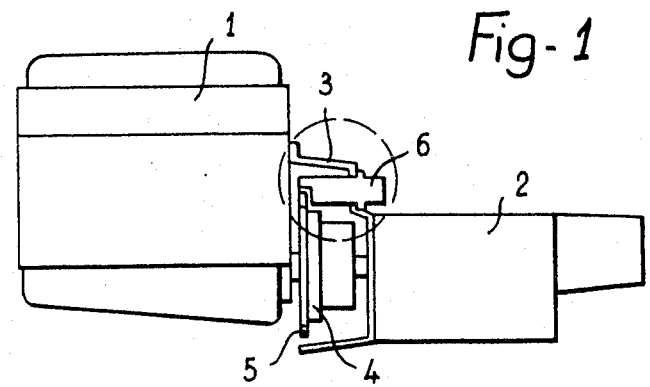

United States Patent [19]
Lombard

[11] 3,842,299
[45] Oct. 15, 1974

[54] DEVICES FOR SENSING THE SPEED AND POSITION OF AN ENGINE FLYWHEEL

[75] Inventor: Glaude Edmond Lombard, Billancourt, France

[73] Assignees: Regie Nationale Des Usines Renault, Billancourt; Automobiles Peugeot, Paris, both of, France

[22] Filed: Apr. 30, 1973

[21] Appl. No.: 355,423

[52] U.S. Cl.............. 310/168, 123/149 A, 340/195, 340/271
[51] Int. Cl. ........................................ H02k 19/20
[58] Field of Search .............. 310/10, 15, 168, 171; 123/102, 146.5 A, 149 R, 149 A, 149 C, 149 D; 324/15, 16 T, 16 R, 16 S; 340/192, 195, 271, 62

[56] References Cited
UNITED STATES PATENTS
2,556,471   6/1951   Elam .................................. 324/16 T

*Primary Examiner*—J. D. Miller
*Assistant Examiner*—Harry E. Moose, Jr.
*Attorney, Agent, or Firm*—Stevens, Davis, Miller & Mosher

[57] ABSTRACT

A speed and position sensing device mounted in a casing in front of the flywheel of an internal combustion engine, and comprising sensing members, said device comprising a body, the active portions of which are located in front of abrupt changes of the periphery of said flywheel, said body being adapted to penetrate into at least one casing through holes, the axes of which are parallel with the rotation axes of said flywheel.

Said sensing device can be used e.g. for energizing an electronic ignition device or controlling gasoline injection.

3 Claims, 2 Drawing Figures

PATENTED OCT 15 1974 3,842,299

DEVICES FOR SENSING THE SPEED AND POSITION OF AN ENGINE FLYWHEEL

The present invention relates to devices for sensing the speed and position of the flywheel of an internal combustion engine.

In electronic systems as applied to automotive vehicles, it is rather common practice to use sensing devices aligned with slots made in the flywheel of an internal combustion engine or with fingers attached to said flywheel.

Such sensing devices can be used e.g. for energizing an electronic ignition device, controlling petrol injection or measuring the engine speed of rotation.

In quite a number of engines, the flywheel has a small axial thickness and is located flush with the plane of assembly of the engine crank-case to the clutch housing or gear-casing.

Thus positioning a sensing device, and still worse two of them, in the usual manner which consists in boring radial peep-holes in alignment with the flywheel, results in detrimentally lessening the moment of inertia, and therefore the rigidity of one of the two casings along their plane of junction.

The present invention mainly relates to improvements in the structure and positioning of sensing devices on an engine casing in front of the engine flywheel, which eliminate the above-mentioned drawbacks by axially positioning the sensing device, so that it is possible to preserve a fixation web of fairly large area against the casing.

An advantage of such a positioning is to be in agreement with most of gear-casing machining operations and to determine the spacing between the sensing device and the flywheel with very good accuracy, since it entails boring a hole the spacing of which with the rotation axis of the engine flywheel can be adjusted to less than 1 mm.

Accordingly, there is no need of adjusting the spacing between the sensing device and the flywheel in the assembly line.

Figure 2:
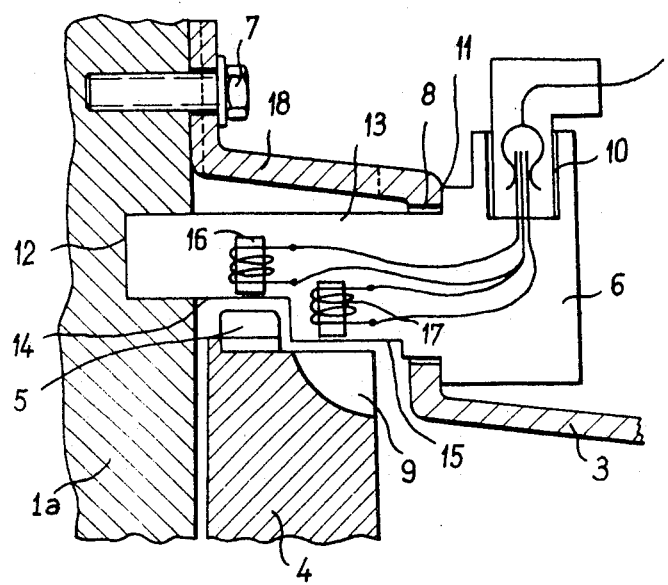

The invention will now be more particularly described, by way of non-limitative example only with reference to the accompanying drawing, wherein:

FIG. 1 is a general cross-section through an engine and its gear-box, showing the location of the sensing device with respect to the flywheel, and FIG. 2 is a detail view, in axial cross-section, of the encircled portion A of FIG. 1, the embodiment shown comprises two sensing members in the same sensing device, one of these members being intended to detect the teeth of the starting ring gear, while the other serves to detect dead-center markings on the flywheel.

In FIG. 1 are shown an engine 1, a gear box 2, a clutch housing 3, a flywheel 4, a starting ring gear 5 and a sensing device 6 according to the invention.

FIG. 2 comprises the same elements and, in addition, a screw 7 for fixing the clutch housing 3 to the engine crankcase 1a, a hole 8 for introducing the sensing device into the clutch housing (the axis of said hole being parallel with the rotation axis of flywheel 4) and a radial slot 9 for detecting on flywheel 4 the upper and/or lower dead centers of the engine pistons.

Sensing device 6 according to the invention, whose electric connection is at 10, is in axial abutment either against clutch housing 3 at 11, or against or within crank-case 1a of the engine at 12.

Said sensing device can therefore be radially maintained at 12 by axially penetrating into the engine crank-case. Abutment against the latter is to be preferred, since indeed the position of flywheel 4 is defined with respect to crank-case 1a.

The body 13 of the sensing-device is usually cylindrical in shape and it may be provided with two flat portions 14 and 15, which however are not strictly needed, since the corresponding surfaces might be cylindrical just as well without impairing the operation. The first flat portion, viz 14, faces with the teeth 5 of the starting gear, whereas the second flat portion, viz 15, faces slots 9 of the flywheel.

A first member 16 of the sensing device adapted to sense the passage of teeth 5, and shown in the figure in the form of a solenoid coil, is located in close proximity to first flat portion 14 in order not to give rise to a useless gap between the sensing device and the teeth of the starting ring gear. A second sensing member 17 is located near second flat portion 15, in front of slots 9 of flywheel 4.

Should no flat portion such as 14 and 15 be provided, body 13 of the sensing device could comprise staggered cylindrical portions; in such a case, the gap between the sensing device and the flywheel could be somewhat wider than in the case of flat portion.

Such a dual sensing device permits in particular to accomodate abrupt changes in the engine rotation velocity, in view of the numerous teeth of the starting ring gear, the number of which being usually above a hundred. Such a sensing device will therefore provide an improvement with respect to systems of the prior art which can measure but one or two events at every rotation of the engine. Sensing members 16 and 17 can be of any known type, e.g. having magnet elements and magnetoresistors, or elements using the Hall effect, or else variable reluctance elements, or printed circuits forming two adjacent flat loops.

In FIG. 2 are shown in dotted line the limits of the passage hole 18 of a sensing device mounted in the usual way. It is easy to understand how such a positioning contributes to locally weaken clutch housing 3.

What is claimed is:

1. A speed and position sensing device mounted in a casing in front of the flywheel of an internal combustion engine having a crankcase, said flywheel having on one side of its periphery a plurality of projections constituting a first kind of abrupt changes in the periphery and on the other side of its periphery at least one other kind of abrupt change, and the sensing device comprising at least two sensing members preferably of the variable reluctance type, said device comprising a body having at least two active portions each enclosing a respective one of said at least two sensing members, each of said portions being located radially outwardly of a respective one of said kinds of abrupt changes in the periphery of said flywheel and being parallel to the axis of said flywheel, said body being adapted to penetrate through holes into at least one casing fixed to said engine, the axes of said holes being parallel with the axis of rotation of said flywheel.

2. A sensing device according to claim 1, wherein said other abrupt change in said flywheel periphery comprises at least one radial slot, one of said sensing members being disposed radially outwardly of said slot.

3. A sensing device according to claim 1, wherein said device body is mounted in axial abutment against said engine crank-case in order to provide accurate axial positioning of said sensing members with respect to said flywheel.

* * * * *

UNITED STATES PATENT AND TRADEMARK OFFICE
CERTIFICATE OF CORRECTION

PATENT NO. : 3,842,299

DATED : October 15, 1974

INVENTOR(S) : Claude Edmond LOMBARD

It is certified that error appears in the above-identified patent and that said Letters Patent are hereby corrected as shown below:

The claim for priority in the heading of this patent is omitted and should be inserted as follows:

French Patent Application No. 72/15.914 filed May 4, 1972.

Signed and Sealed this second Day of March 1976

[SEAL]

Attest:

RUTH C. MASON
Attesting Officer

C. MARSHALL DANN
Commissioner of Patents and Trademarks